(12) United States Patent  (10) Patent No.: US 8,100,336 B2
Chew et al.  (45) Date of Patent: Jan. 24, 2012

(54) METHOD OF UNBLOCKING A LOCKED APPLICATION USING A PERSONAL IDENTIFICATION NUMBER

(75) Inventors: Gary Chew, Aix-En-Provence (FR); Eric Plet, Saint Zacharie (FR); Max De Groot, La Bouilladisse (FR)

(73) Assignee: Gemalto SA, Meudon (FR)

( * ) Notice: Subject to any disclaimer, the term of this patent is extended or adjusted under 35 U.S.C. 154(b) by 86 days.

(21) Appl. No.: 11/667,120

(22) PCT Filed: Oct. 24, 2005

(86) PCT No.: PCT/EP2005/055481
§ 371 (c)(1),
(2), (4) Date: Jan. 15, 2008

(87) PCT Pub. No.: WO2006/048390
PCT Pub. Date: May 11, 2006

(65) Prior Publication Data
US 2009/0159692 A1  Jun. 25, 2009

(30) Foreign Application Priority Data
Nov. 8, 2004  (FR) ...................................... 04 11880

(51) Int. Cl.
*G06K 19/06* (2006.01)
(52) U.S. Cl. ........ 235/492; 235/379; 235/380; 235/382; 235/487; 705/72; 713/183

(58) Field of Classification Search .................. 235/379, 235/380, 382, 487, 492; 705/72; 713/183
See application file for complete search history.

(56) References Cited

U.S. PATENT DOCUMENTS

| 4,983,816 A * | 1/1991 | Iijima ........................... 235/379 |
| 5,444,764 A * | 8/1995 | Galecki ......................... 455/411 |
| 5,907,804 A * | 5/1999 | Schroderus et al. ........... 455/411 |
| 2003/0057272 A1* | 3/2003 | Bidan et al. .................... 235/380 |
| 2003/0085286 A1* | 5/2003 | Kelley et al. ................... 235/492 |
| 2004/0005911 A1* | 1/2004 | Guirauton et al. ............ 455/558 |
| 2004/0122774 A1 | 6/2004 | Studd et al. |

FOREIGN PATENT DOCUMENTS

EP  1 467 312 A  10/2004

OTHER PUBLICATIONS

*PCT/ISA/210.

* cited by examiner

*Primary Examiner* — Daniel Hess
*Assistant Examiner* — Ali Sharifzada
(74) *Attorney, Agent, or Firm* — Buchanan Ingersoll & Rooney PC

(57) ABSTRACT

The invention relates to a method of securing applications on a chip card which is disposed in a digital appliance. A count is made of the number of times a personal identification number of a chip card application is input erroneously. When this number reaches a threshold, the application or the chip card is blocked. The erroneous input count and unblocking the chip card or the application is restarted when the personal identification number of the chip card is input. In this way, PIN-secured applications offer a high level of security without requiring the storing of additional unblocking data.

12 Claims, 2 Drawing Sheets

METHOD OF UNBLOCKING A LOCKED APPLICATION USING A PERSONAL IDENTIFICATION NUMBER

FIELD OF THE INVENTION

The invention concerns applications secured by an identification number, commonly known as a PIN code or personal identification number.

BACKGROUND OF THE INVENTION

A UICC card (a chip card materially defined in standard ISO 7816-X) of the SIM type (short for Subscriber Identity Module in English) or USIM (short for Universal Subscriber Module in English) conventionally memorises personal data and applications. The majority of USIM cards only provide access to data or applications once the user has entered a personal identification number (PIN) of the chip card. A counter formed in a non-volatile memory of the UICC card memorises the number of incorrect entries of the PIN of the chip card and the maximum permitted number thereof. The method of entry of the PIN of the chip card is blocked and with it the card, when the number of incorrect entries is equal to the maximum permitted number. Reinitialisation of the counter is performed either when a valid PIN of the chip card is entered before blocking or when a PIN unblocking code (PUK—PIN Unblock Key) is entered after blocking. Entry of the PUK after blocking unblocks the UICC card.

In practice, a user only infrequently uses the PUK associated with the chip card PIN. Therefore, when his/her UICC card is blocked, he/she generally does not have any PUK code available, because it is not memorized for example or because he/she has mislaid the certificate mentioning the PUK. The majority of telephone operators have set up telephone platforms designed to provide the user of the UICC card with a PUK code. The user often does not have the telephone number of the platform of his/her operator available. Furthermore, these platforms are costly and require means of identification of the user in order to avoid providing a PUK to a trickster.

UICC cards (and digital devices in general) present an increasing number of applications safeguarded by a application personal identification number (hereafter known as the application PIN) and sometimes developed by a company other than the telephone operator issuing the UICC card. Since each of these applications may present a specific application PIN and a PUK code, the user does not have all these date available in practice in case of need. The telephone platforms are more complex to organise in this case, with each company being required to memorize a databank for the PUK codes of its application.

The user must furthermore identify which platform to contact in order to unblock the UICC card. For these various reasons, a large number of applications are not locked by an application PIN.

SUMMARY OF THE INVENTION

The invention aims to offset one or several of these disadvantages. The invention therefore refers to a method for securing applications of a chip card arranged in a digital device, comprising the stages of:
  counting the incorrect entries of a personal identification number of an application of the chip card;
  when the number of incorrect entries reaches a threshold, blocking of the application or the chip card;
  reinitialisation of counting of the incorrect entries and unblocking of the chip card or the application when the personal identification number of the chip card is entered.

According to one variant, the chip card used is a UICC-type chip card equipped with a SIM or USIM application provided by the telephone operator and the digital device is a mobile telephony device.

According to a further variant, the chip card orders issue of an alert to a control authority when the number of incorrect entries reaches a predetermined threshold.

According to another variant, the chip card used is a chip card of the bank card type supplied by a telephone operator.

According to one more variant, the chip card orders switching off of the digital device following the blockage.

One may furthermore make provision for the process involving no stage of entry of an unblocking code for the personal identification number of the application.

According to a variant, reinitialisation of counting and unblocking is performed when the personal identification number of the chip card is entered following reinitialisation of the chip card.

The invention furthermore refers to a chip card comprising:
  a personal identification number of the chip card, the entry of which is necessary in order to access all or part of the card;
  an application associated with an application personal identification number different in its implementation of the personal identification number of the card;
  a counter of the number of incorrect entries of the application personal identification number;
  a processing module blocking the card or the application when the number of incorrect entries reaches a predetermined threshold and requiring valid entry of the personal identification number of the card in order to unblock the card or the application and reinitialize the counter.

According to one variant, the card is of the UICC type with a SIM, USIM application and supplied by a telephone operator.

According to a further variant, the card is capable of transmitting an order to issue an alert to a host digital device when the number of incorrect entries reaches a predetermined threshold.

According to another variant, the card is capable of transmitting an order to switch off the digital device when the number of incorrect entries reaches a predetermined threshold.

BRIEF DESCRIPTION OF THE DRAWINGS

Other characteristics and advantages of the invention will be clearly apparent from the description made thereof below, as a guide and in no way limitative, with reference to the appended drawings in which.

DETAILED DESCRIPTION OF THE DRAWINGS

The invention proposes to equip an application of a chip card with an application personal identification number and to count the incorrect entries of this identification number. When the number of incorrect entries reaches a predetermined threshold, the application or the chip card is blocked. Counting of the incorrect entries is reinitialized and the application or the card is unblocked when the card is reinitialized and the correct personal identification number of the chip card is entered. The PIN of the chip card is therefore used as an unblocking code for secure applications.

Applications safeguarded by an application PIN therefore present a high level of security without any need for an increase in the unblocking data to be memorized. The applications are for example those complying with STK specifications and issuing orders to the device accommodating the chip card.

Figure 1:
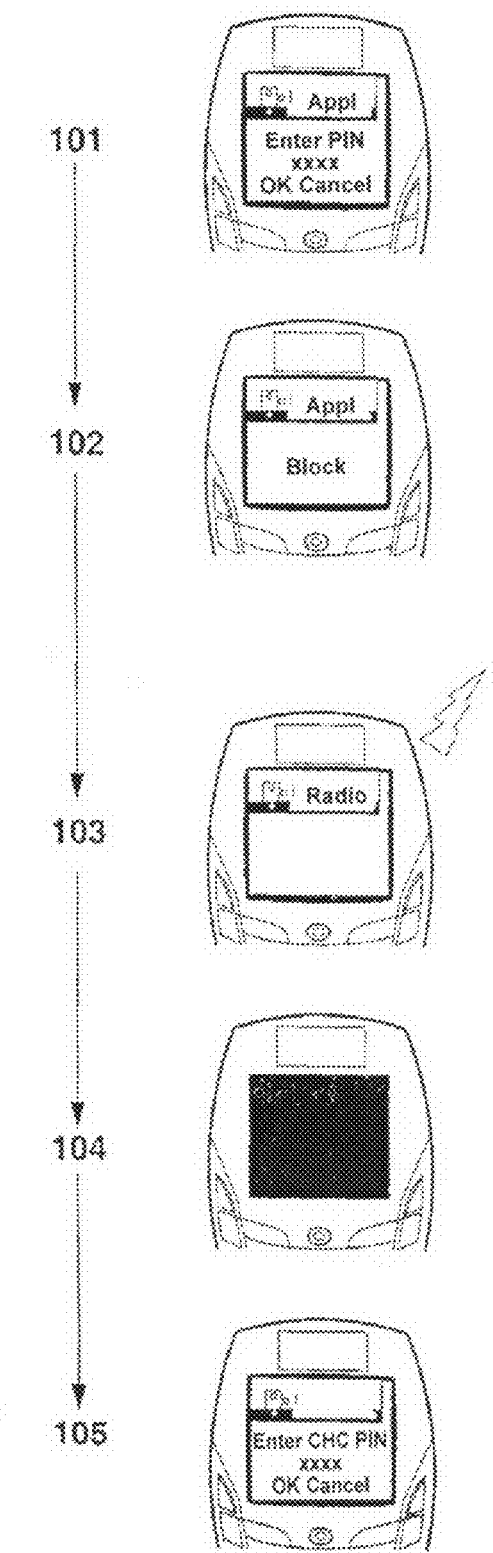
FIG. 1 represents various stages of implementation of a method according to the invention in its application to a mobile telephone device.

FIG. 1 represents various stages of an example of a method according to the invention. The chip card of the example is an USIM card connected to a host mobile telephone handset.

In stage 101, a user has previously entered the PIN of the USIM card and has therefore had access to a certain number of elements of data and functionalities of this card, particularly access to the mobile telephone network. At stage 101, the user wished to use a secure application of the chip card. The handset requires entry of the PIN of this application.

At stage 102, the application is blocked: the chip card has previously counted the number of incorrect entries of the PIN of the application and has determined that this number has reached a predetermined threshold. The threshold may adopt a value of 3, the usual value for test of a PIN code of an USIM card. The blocking may adopt several forms: access to the data of the chip card is restricted or prohibited, the desired application or others are prohibited or further entry of the PIN of the application is blocked.

At stage 103, the chip card advantageously orders the handset to transmit an alert to a control authority. The alert is transmitted in the form of an SMS for example. The alert may be issued at each blockage or after having counted a predetermined number of blockages. The alert may define the secure application which has given rise to the blockage, an identifier of the handset or any other information useful for a control authority. The control authority is the body which incorporated the secure application in the chip card for example. The chip card may contain various different telephone numbers of control authorities associated with respective secure applications. Therefore, each control authority may manage the fraud problems related to its applications.

At stage 104, the user is obliged to switch off the handset with a view to entering the PIN of the chip card. This stage makes it possible to cause a possible trickster knowing the PIN of the chip card and wishing to find the PIN of the application by trial and error to waste time. Another solution consists in ordering switching off of the headset by the chip card application.

At stage 105, the headset requires entry of the PIN of the chip card, marked CHC PIN in FIG. 1. If the user enters the correct PIN of the chip card, the application is unblocked and counting of the incorrect entries is reinitialized. Therefore, test of the application PIN by trial and error assumes that the chip card PIN is known, which reduces the risks of fraud for an application. Furthermore, if a trickster recovers a handset and a chip card, the chip card PIN of which has been previously entered by the legitimate user (for example following theft of a switched on handset), the test of the PIN of the application further secures the application: the trickster will at some point have to enter the PIN of an application and following blockage of the latter, he will be required to enter the PIN of the chip card which had not been required up to then. One may also make provision for transmission of an optional alert being performed at the stage of entry of the chip card PIN, for example following blocking of the PIN code of the application.

Figure 2:
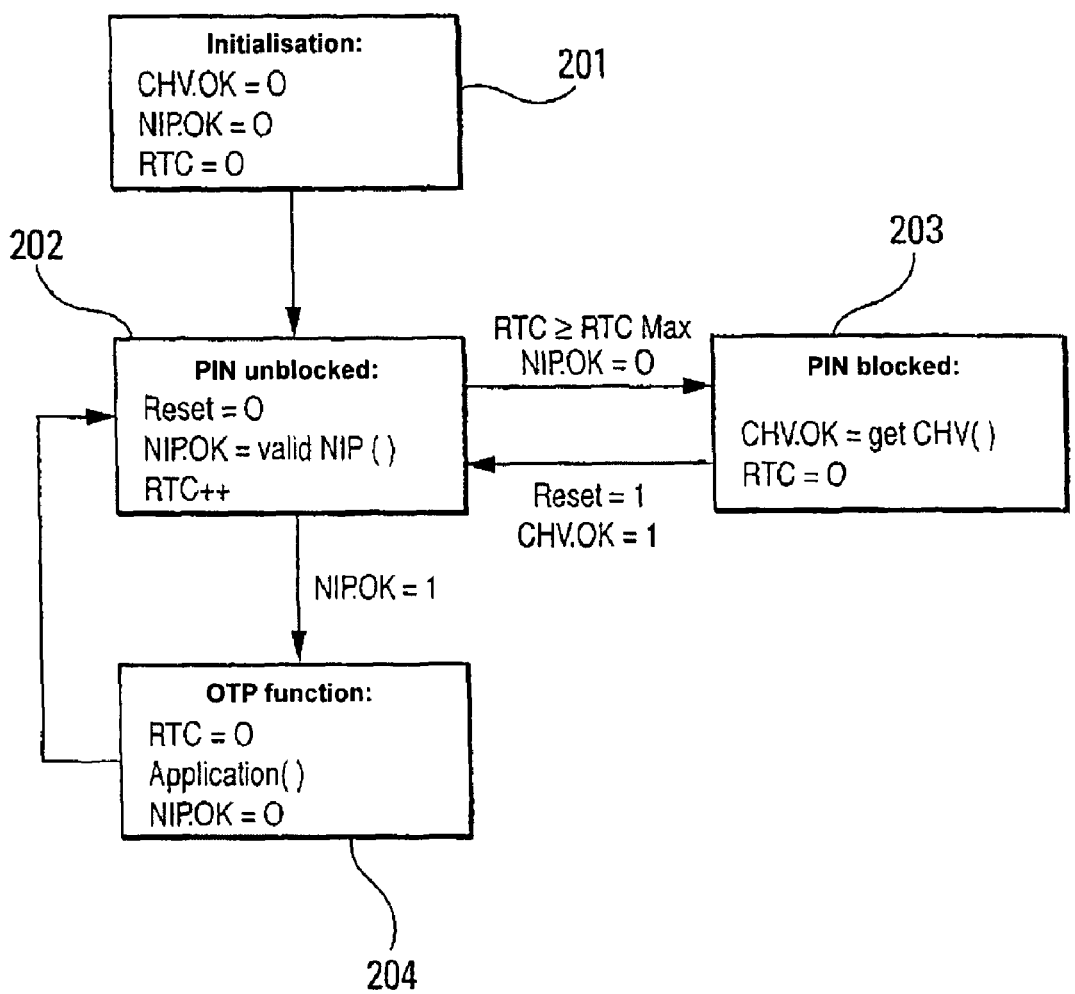
FIG. 2 illustrates functioning of a status machine used by an application, employing the invention.

FIG. 2 illustrates functioning of a status machine used by an application in order to manage administration of its PIN. The indications placed on the arrows correspond to the conditions of passage from one status to another. The operations performed in each state are described in detail in each associated rectangle.

Status 201 corresponds to a status of initialization of the chip card or unblocking of the application. The flag CHV.OK is initialized to 0. This flag serves to determine whether the chip card PIN has been validly entered. The flag NIP.OK is initialized to 0. This flag serves to determine whether the PIN of a given application has been validly entered. The counter RTC is initialized to 0. This counter identifies the number of entries of the application PIN.

Status 202 corresponds to a test status of the application PIN entered by a user. The reset flag is set to 0. This flag serves to indicate whether or not reinitialisation of the application has occurred. The function validNIP( ) makes the PIN request to the user and returns a value indicating whether entry of the application PIN is valid or not. A valid application PIN results in a value of 1 whereas an invalid application pin results in a value of 0 of this function. The result of the function validNIP( ) is subsequently placed in the flag NIP.OK. The counter RTC is incremented.

Status 203 corresponds to a status of entry of the PIN of the chip card in order to unblock the application. Status 203 is obtained when the following cumulative conditions are fulfilled:
when the counter RTC reaches the threshold RTCMax, meaning that an incorrect application PIN has been entered an RTCMax number of times;
when the flag NIP.OK has a zero value, meaning that an incorrect application PIN has just been entered.

During status 203, entry of the chip card PIN is required. The function getCHV( ) issues the request for the chip card PIN to the user and returns a value indicating whether entry of the chip card PIN is valid or not. If the chip card PIN entered is valid, the function getCHV( ) adopts a value of 1, otherwise the function getCHV( ) adopts a value of 0. The result of the function getCHV( ) is subsequently placed in the flag CHV.OK. The flag RTC adopts a value of 0.

From status 203, one transfers to status 202 when the following cumulative conditions are fulfilled:
when the flag CHV.OK has a value of 1
and when the reset flag has a value of 1, which indicates that the chip card is reinitialized.

Status 204 indicates the status in which the application is functional, in case of valid entry of the application PIN. Therefore, status 204 is only obtained when the flag NIP.OK adopts a value of 1. The counter RTC is reinitialized in this case and the function 'Application( )' executes the application. The flag PinOK adopts a value of 0 in this case.

The invention claimed is:

1. A method of securing applications on a chip card which is disposed in a digital appliance, comprising the steps of:
permitting access to the chip card upon verification of a personal identification number (PIN) of the chip card;
counting, upon verification of the PIN of the chip card, a number of incorrect entries of a PIN specific to a given application of the chip card, wherein said PIN of the application is different from the PIN of the chip card;
when the number of incorrect entries of the PIN of the application reaches a threshold, blocking the given application or the chip card; and re-initializing said counting of the incorrect entries and unblocking the chip card or the application when the PIN of the chip card is entered.

2. A method according to claim 1, wherein:
the chip card used is a UICC-type chip card equipped with an SIM or USIM application supplied by a telephone operator;
the digital appliance is a mobile telephone device.

3. A method according to claim 2, wherein the chip card orders an issuance of an alert to a control authority when the number of incorrect entries reaches a predetermined threshold.

4. A method according to claim 1, wherein the chip card used is a chip card of a bank card type provided by a telephone operator.

5. A method according to claim 1, wherein the chip card orders a switching off of the digital device following blocking.

6. A method according to claim 1, wherein said re-initializing of the counting and said unblocking of the chip card or the application is performed when the PIN of the chip card is entered following re-initialization of the chip card.

7. A chip card, comprising:
a personal identification number (PIN) of the chip card, the entry of which is necessary in order to access the card;
a given application associated with specific application PIN, wherein said application PIN is different from the PIN of the chip card;
a counter configured to count the number incorrect entries of the application PIN, upon verification of the PIN of the chip card; and
a processing module blocking the chip card or the given application when the number of incorrect entries of the application PIN reaches a predetermined threshold and requiring valid entry of the PIN of the chip card in order to unblock the chip card or the given application and re-initialize the counter.

8. A chip card according to claim 7, wherein said card is of the UICC type with an SIM, USIM application and supplied by a telephone operator.

9. A chip card according to claim 8, wherein said card is capable of transmitting an order to issue an alert to a host digital device when the number of incorrect entries reaches a predetermined threshold.

10. A chip card according to claim 7, wherein said card is capable of transmitting an order to switch off the digital device when the number of incorrect entries reaches a predetermined threshold.

11. A chip card according to claim 8, wherein said card is capable of transmitting an order to switch off the digital device when the number of incorrect entries reaches a predetermined threshold.

12. A chip card according to claim 9, wherein said card is capable of transmitting an order to switch off the digital device when the number of incorrect entries reaches a predetermined threshold.

* * * * *